P. SPURGIN.
LANTERN.
APPLICATION FILED APR. 10, 1912.
1,057,364.
Patented Mar. 25, 1913.
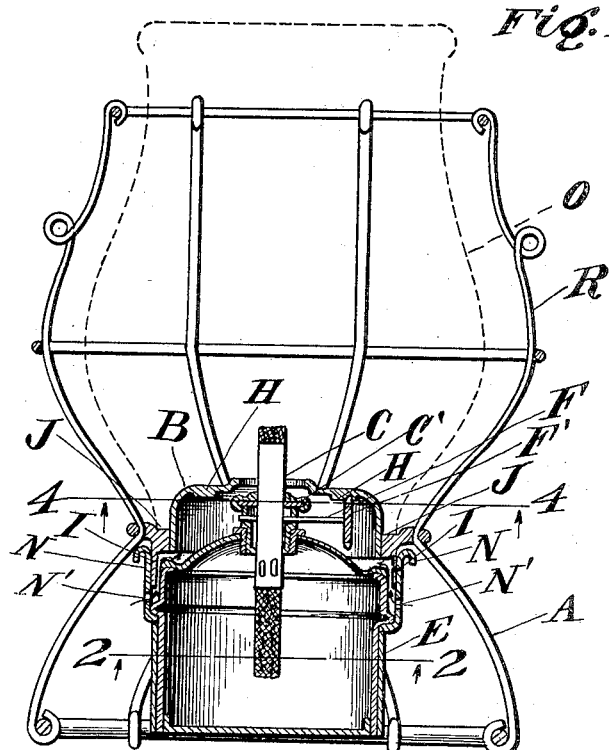
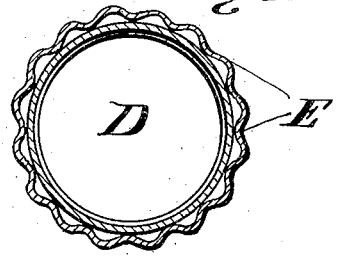
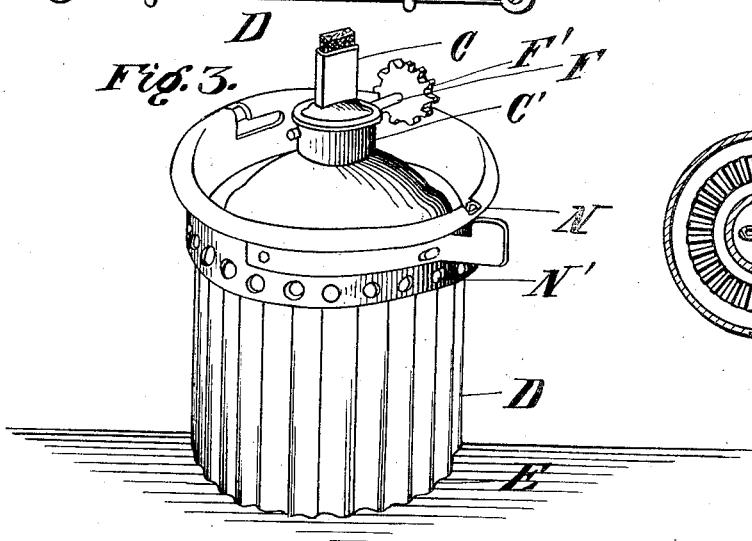
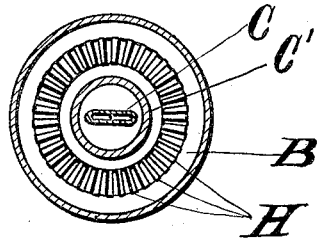
Witnesses
Robt Meyer.
A. L. Hough.
Inventor
P. Spurgin.
By Franklin N. Hough
Attorney

UNITED STATES PATENT OFFICE.

PETER SPURGIN, OF EDGEMONT, SOUTH DAKOTA.

LANTERN.

1,057,364.  Specification of Letters Patent.  Patented Mar. 25, 1913.

Application filed April 10, 1912. Serial No. 689,848.

*To all whom it may concern:*

Be it known that I, PETER SPURGIN, a citizen of the United States, residing at Edgemont, in the county of Fall River and State of South Dakota, have invented certain new and useful Improvements in Lanterns; and I do hereby declare the following to be a full, clear, and exact description of the invention, such as will enable others skilled in the art to which is appertains to make and use the same, reference being had to the accompanying drawings, and to the letters and figures of reference marked thereon, which form a part of this specification.

This invention relates to new and useful improvements in lanterns so arranged that the light will not be extinguished from jar or excessive wind and especially adapted for use upon railways.

The invention comprises various details of construction and combinations and arrangements of parts which will be hereinafter fully described, shown in the accompanying drawings and then specifically defined in the appended claim.

I illustrate my invention in the accompanying drawings, in which:—

Figure 1 is a vertical central sectional view through a lantern made in accordance with my invention. Fig. 2 is a cross sectional view on line 2—2 of Fig. 1. Fig. 3 is a detail perspective of the font, and Fig. 4 is a section on line 4—4 of Fig. 1, showing the series of cog teeth on the under surface of the plate upon which the globe is adapted to rest.

Reference now being had to the details of the drawings by letter, A designates the frame of a lantern which has fixed thereto the inverted cup-shaped member B, centrally apertured for the reception of the wick tube C of the burner C', which latter is fastened to the font D. Said font is made up of an inner shell D' and an outer fluted or corrugated shell E so that a person may have a secure hold upon the said corrugated surface when it is desired to rotate the font in the act of raising or lowering the wick. The font is provided with a wick turning shaft F, having a pinion wheel F' fixed to one end thereof and which is in mesh with a circular series of teeth H formed on the under surface of the member B, as shown clearly in Fig. 4 of the drawings. A flanged collar N, having perforations in its circumference, is adapted to telescope over a fixed part I of the burner which is fastened to the frame and is adapted to have bayonet slot connections with the part over which it telescopes. Said collar N is perforated at N' to allow air for combustion purposes to pass therethrough and thence through a space intermediate the wall of the font and that portion of the burner with which the flanged shell has bayonet slot connection, thus affording a supply of air for combustion.

A flaring flange J projects from the plate B and is adapted to retain the globe O about which the frame is disposed.

The operation of my invention will be readily understood and is as follows:—The globe, it will be noted, is inserted and held by the flaring portion of the member, while the latter telescopes within the flange about the circumference of the font. When the parts are adjusted in place, the pinion upon the wick turning shaft is in mesh with the circular series of cog teeth and, when it is desired to turn the wick up or down, the operator by taking hold of the fluted circumference of the font may cause the same to be turned in one direction or the other, thereby causing the wick to be raised or lowered. By the mechanical construction shown, it will be noted that, while a sufficient quantity of air for combustion purposes is allowed to pass through to the font, the parts are so arranged that any wind from different directions about the latter will be prevented from blowing out the light.

What I claim to be new is:—

A lantern comprising a frame having an inverted cup-shaped member with a slot therein for the reception of the wick tube, the under surface of said member having a circular series of teeth, a flanged shell fitted about the circumference of said member, a flanged circumferentially perforated collar in which said shell telescopes and with which it has bayonet slot connection, the lower end of said collar being contracted, a rotatable oil font with a beading about its circumference resting upon the inwardly turned marginal end of said collar, a burner fitted to the font and having a wick turning shaft with a toothed wheel engaging the teeth upon said inverted cup-shaped member, a space intervening between said shell and the outer face of the font to allow air to pass through the perforations of the collar to the burner, as set forth.

In testimony whereof I hereunto affix my signature in the presence of two witnesses.

PETER SPURGIN.

Witnesses:
MARVIN SPURGIN,
J. B. WICKSTRONE.

Copies of this patent may be obtained for five cents each, by addressing the "Commissioner of Patents, Washington, D. C."